United States Patent [19]
Laurent et al.

[11] Patent Number: 5,243,562
[45] Date of Patent: Sep. 7, 1993

[54] METHOD AND EQUIPMENT FOR ACOUSTIC WAVE PROSPECTING IN PRODUCING WELLS

[75] Inventors: Jean Laurent, Orgeval; Charles Naville, Grigny; Jean Czernichow, Chatenay-Malabry, all of France

[73] Assignee: Institut Francais du Petrole, Rueil Mamaison, France

[21] Appl. No.: 850,977

[22] Filed: Mar. 11, 1992

[30] Foreign Application Priority Data

Mar. 11, 1991 [FR] France ................ 91/03011

[51] Int. Cl.$^5$ .............................................. G01V 1/40
[52] U.S. Cl. ...................................... 367/25; 166/250
[58] Field of Search ................ 367/57, 911, 25, 35, 367/86; 181/104, 102; 175/40; 166/250

[56] References Cited
U.S. PATENT DOCUMENTS

| | | | |
|---|---|---|---|
| 4,775,009 | 10/1988 | Wittrisch et al. | 166/250 |
| 4,901,289 | 2/1990 | Cretin et al. | 367/57 |
| 5,062,482 | 11/1991 | Graham | 166/250 |
| 5,092,423 | 3/1992 | Petermann | 181/102 |

*Primary Examiner*—Ian J. Lobo
*Attorney, Agent, or Firm*—Antonelli, Terry, Stout & Kraus

[57] ABSTRACT

A method of installing a reception device in a cased well at an optimum depth for surveying a formation under production or a localized part thereof and a source of acoustic waves at the surface or in a well. A placing or setting of the device is achieved by associating a plurality of acoustic wave reception units with a tubing lowered into the well and by applying the respective units against the pipe casing of the well by arms and springs or by including the reception units in sondes which are mechanically uncoupled from the tubing during the stages of use, with the reception device being easily moved by displacing the tubing during, for example, interruptions in the production of effluents.

2 Claims, 2 Drawing Sheets

FIG. 2
FIG. 3
FIG. 4
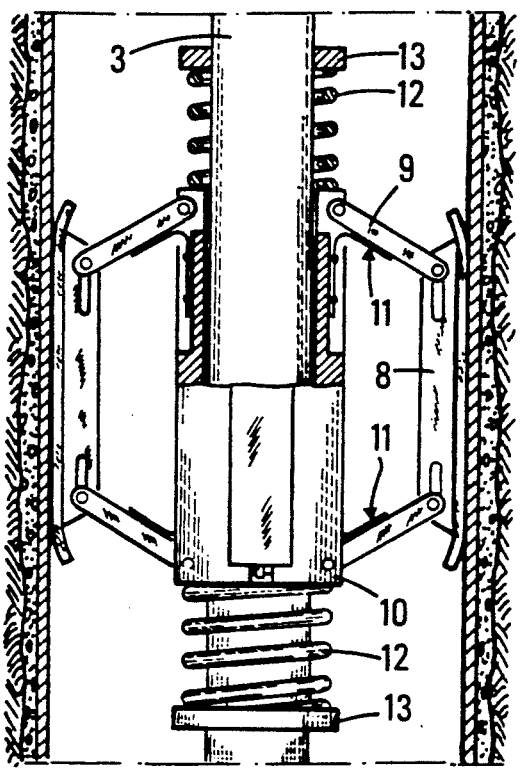
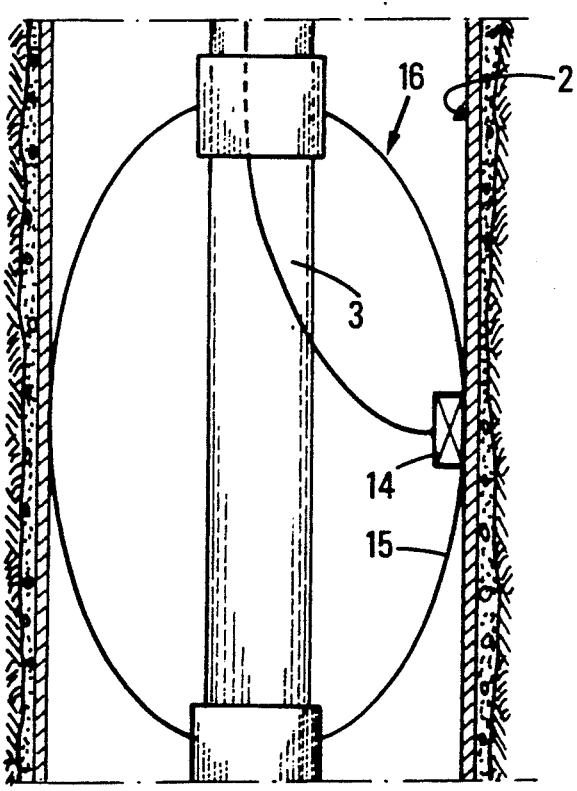
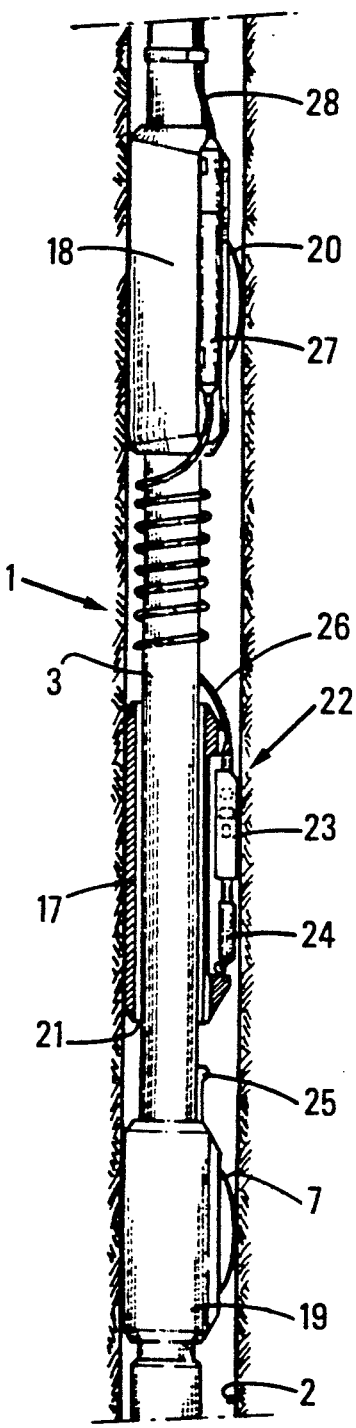

METHOD AND EQUIPMENT FOR ACOUSTIC WAVE PROSPECTING IN PRODUCING WELLS

FIELD OF THE INVENTION

The present invention relates to a method for prospecting well by acoustic waves, with the wells being drilled across subsurface formations and equipped for the production of effluents and a device for carrying out the method.

The method according to the inventions may for example apply to seismic operations performed in wells equipped for the production of petroleum effluents.

BACKGROUND OF THE INVENTION

The equipment for wells of the aforementioned type generally include a casing bonded to the walls of the well by injecting cement into the annular space. A tubing with a cross section less than a cross section of the casing is taken down into the well as far as the producing zone. It is provided towards the base thereof with one or several packers. The annular space between the tubing and the casing is sealed through the expansion of these sealing parts. The tubing is used for taking the petroleum effluents up to the surface or for various interventions such as, for example, injecting substances into the subsurface formations to stimulate the production.

In a producing well, it is useful to carry out seismic plottings to know the development of the effluent saturation of the oil-bearing strata during the exploitation thereof, and these plottings can be achieved in a particular area of the formation. A method of the VSP (vertical seismic profiling) type may, for example, be implemented, which comprises receiving the waves reflected by the geologic formations or transmitted through them, by several sensors taken down along the well, these waves being transmitted by a seismic generator arranged at the surface or in another well.

It is also sometimes desirable to remove the sensors from a well whose exploitation possibilities prove to be insufficient and to install them in another well. It may be profitable to take advantage of production interruptions which occur on the occasion of maintenance operations, for example, for moving the reception device.

A process and a device for setting up a seismic reception assembly outside, the casing of a well are proposed in U.S. Pat. Nos. 4 775,009, 4,986,350 and French Application 2,642,849. The process essentially consists in arranging sensors outside the casing, preferably in housings provided to that end,, at the time of the setting up thereof and in surrounding the sensors in the cement that is injected into the annular space between the casing and the walls of the well.

This process has the advantage of facilitating the coupling of the sensors with the formations. On the other hand the irreversible nature of the set up is disadvantageous, the sensors are not recoverable. The permanent immobilization of the sensors is more annoying. It is well-known that, notably with seismic methods of the VSP type, it can be useful to change the position of the assembly of receivers along the well to take into account the modification of the deposit in the course of time, resulting from the production of effluents. Surveying a deposit under production by acoustic waves therefore requires a movable seismic device.

A sonde adapted to be lowered into a well equipped for production and connected to a tubing is is proposed in French Application 2,656,034 and corresponding U.S. Ser. No. 631,253. This sonde comprises an intermediate shoe provided with a central passageway wider than the tubing, arranged between two off centering shoes fixed outside of the tubing. The intermediate shoe comprises a moving device shiftable between a recess position and a position of coupling with the wall of the well under the action of springs, and a housing for sensors and hydraulic triggering means are arranged in the moving device. The device is arranged in such a way that, in the working position, the housing is applied against the wall of the casing and the intermediate shoe is mechanically uncoupled from the tubing.

SUMMARY OF THE INVENTION

The method according to the invention allows to carry out investigative operations by acoustic waves in a well crossing geologic formations and equipped for the production of effluents, with the equipment comprising a casing and a tubing having a cross section less than a cross section of the casing.

In accordance with the present invention, a source of acoustic waves is coupled with deformations to be explored, a seismic reception device comprising a plurality of reception units connected with the tubing at determined intervals is associated to the tubing, with the reception units being applied to an inner wall of the casing while being connected with an assembly for controlling and recording picked up or sensed signals. The tube is lowered into the well to bring the reception device down to an optimum depth compatible with the zone of a deposit subjected to the investigative operation, and the various reception units are coupled with the wall of the casing. Transmission-reception cycles are obtained by a triggering of the source of acoustic waves, with the reception by the various units of the reception device of the waves coming from the deposit after triggering of the source and the transmission to the control and recording assembly of signals picked up by the reception units. The reception device is moved through a translation of the tubing along the well.

The method according to the invention is advantageous in that it allow a movement of the reception device and enable a possible recovery of the reception device by taking advantage, for example, of producing interruptions which are achieved for various maintenance operations.

Guiding the reception units being performed by a stiff part such as a tubing, the method according to the invention may, for example, also be used for carrying out investigations with acoustic waves in deflected wells where the use of well sondes progressing by the own weight thereof proves to be impossible.

The method comprises, for example, using reception units which can be mechanically uncoupled from the tubing.

The method of the present invention may also comprise using a plurality of reception units each comprising a housing for at least one acoustic wave sensor, movable linking elements attached to the tubing and means for applying each reception unit onto the wall of the casing by displacing said linking elements.

The linking elements may, for example, include adapted to arms pivot with respect to the tubing.

The linking elements may, for example, include spring-driven centering means for centering the tubing in the casing.

The equipment for implementing the method comprises a source of acoustic waves, a reception device a plurality of reception units connected with the tubing at determined intervals, each one of them comprising a housing for at least one acoustic wave sensor and means for coupling said housing against the inner wall of the casing, a control and recording assembly, electric connection means for connecting the different reception units to the assembly, and operating means for moving the reception device along the well by displacing the tubing.

The means for coupling each housing between the wall of said casing comprise for example moving arms associated with spring means.

Said means for coupling each housing between the wall of said casing may also, for example, include spring-driven centering elements.

BRIEF DESCRIPTION OF THE DRAWINGS

Other features and advantages of the method and the device according to the invention will be clear from reading the description hereafter of embodiment procedures described by way of non limitative examples, with reference to the accompanying drawings wherein:

FIG. 2 shows a first means for connecting each reception unit with the tubing and allowing the coupling thereof with the casing;

FIG. 3 shows a second means for connecting each reception unit; and

FIG. 4 shows a reception unit which can be mechanically uncoupled from the tubing.

DESCRIPTION OF THE PREFERRED EMBODIMENTS

Figure 1:
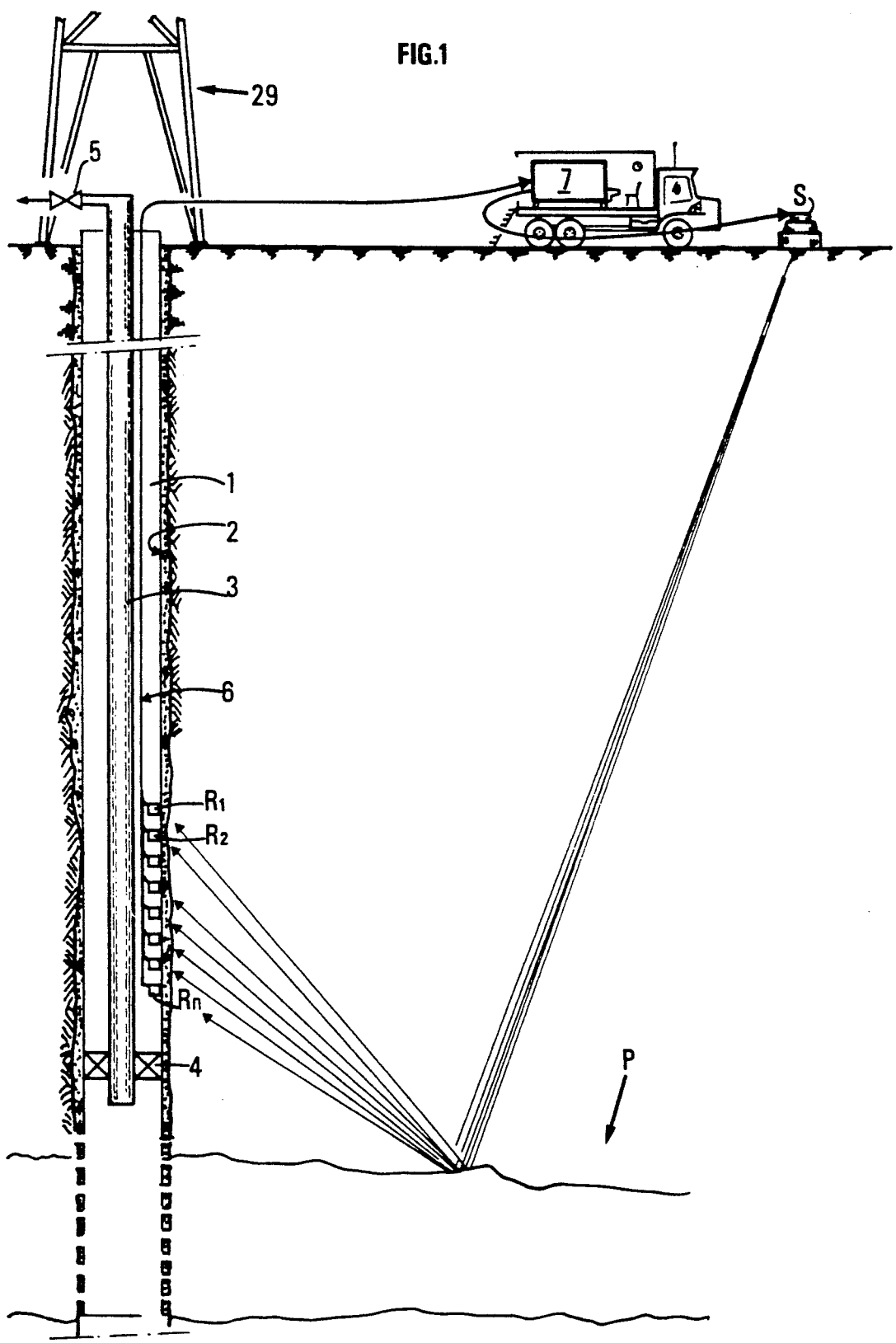
FIG. 1 shows the flowsheet of a prospecting system utilizing acoustic waves in wells with a reception device arranged in an appropriate way with respect to a transmitter for picking up acoustic signals emitted from a geologic formation following the transmission of acoustic waves in this formation.

As shown in FIG. 1 a well 1 is drilled down to a subsurface production zone P well is equipped for the production of petroleum effluents. The well is provided with a casing 2 which, once it is installed, is coupled with the surrounding formations by injecting cement between the casing and the well. A tubing 3 constituted by interconnecting a succession of tubular sections is lowered into the cased well. This tubing 3 is provided towards the base thereof with a packer 4. The annular space between the tubing 3 and the casing is isolated by expanding the packer 4. The effluents produced by the subsurface deposit are piped along the tubing. Pumping means (not shown) and valves 5 allow to perform a controlled activation of the production.

The method according to the invention comprises associating to the tubing a device for receiving acoustic waves consisting of a plurality of acoustic wave reception units R1, R2, ... Rn which can be coupled with the inner wall of casing 2. These units R1 ... Rn are distributed at determined intervals along the tubing. A multicore cable 6 enables a connection of the reception units R1 ... Rn with a central control and recording station 7 at the surface.

A source of acoustic waves S is arranged near the surface, in another well or possibly in the same well. The reception device is positioned in the well, at a depth selected for favoring the proper reception of the waves coming from a zone of the deposit subjected to an acoustic investigation, following the transmission of acoustic waves in this zone. The optimum depth of installation of the reception device for the planned acoustic wave prospecting is obtained by selecting the tubular sections of the tubing which the reception units are associated with.

Connecting the reception units R1 ... Rn with the central and recording station 7 can be achieved directly through transmission lines in cable 6. It is still preferable in some cases to connect the reception units R1 ... Rn with the central station by an electronic assembly providing the multiplexing of the signals picked up by the various reception units R1 ... Rn and the coded transmission thereof, such as proposed in U.S. Pat. Nos. 4,862,425 and 4,901,289.

According to the embodiment of FIG. 2, the reception units can be included in pads 8 applied against the inner wall of the casing. These pads are for example linked with arms 9 which can pivot, with respect to a coupling 10 centered upon the tubing and held in a spacing or extended position by leaf springs 11. Springs 12 hold sleeve 10 between two fixed stop rings 13.

According to the embodiment of FIG. 3, each reception unit R can be included in a housing 14 attached to the flexible leaves 15 of a leaf off-centering device 16 fixed around a section of tubing 3.

According to the embodiment of FIG. 4, a reception device consisting of a plurality of sondes such as the described in the U.S. Pat. No. 4,986,350. Each sonde comprises an intermediate shoe 17 between two off-centering shoes 18, 19 fixed around tubing 3 at a given distance from one another. The off-centering shoes are provided each with spring leaves 20 identically arranged in order to apply the shoes against the wall of casing 2 along the same radial plane. Intermediate, shoe 17 surrounds tubing 3 in the same way. The intermediate shoe 17 is provided with a central passageway 21 whose section is larger than the section of tubing 3. Intermediate shoe 17 comprises a moving device 22 fitted with lodgings for picking up means 23 such as triaxial geophones for examples. Springs (not shown) are arranged in order to push the moving device towards the position of coupling thereof with the wall of the casing. Hydraulic means comprising a jack 24 enable a control of the displacement thereof towards the extension position. A linking element 25 is used during the lowering of the tubing for linking the intermediate shoe to the two other shoes. The assembly is arranged in such a manner that, in the intervention position, the moving device is in contact with the casing, and the intermediate shoe, 7 is mechanically uncoupled from the tubing. The picking up means are linked through conductors 26 to an electronic acquisition and transmission box 27 which is connected with a multicore cable 28 which provides the linking with the surface central control and recording station 7 (FIG. 1).

Each one of the sondes is installed on a tubing section. The tubing sections equipped with the sondes are, for example, interposed on the tubing at locations selected as the tube is lowered into the well, in order to obtain the desired configuration for the reception device.

When the reception device has reached the desired depth (FIG. 1), one or several transmission-reception cycles are carried out, with the waves being transmitted in the ground by the source S at the surface or in another well, the waves reflected by the discontinuities being received and the picked up signals being transmitted to central station 7 for being recorded.

Moving the reception device from one depth to another where the taking up to the surface thereof is obtained by displacing the tubing by a surface operating system 29.

We claim:

1. A method for conducting seismic or acoustic surveying operations of a subterranean zone producing effluents in a well drilled through geological formations to said subterranean zone, the method comprising the steps of:
   coupling a seismic or acoustic wave source with the geological formations to be explored;
   completing the well by inserting a casing and tubing in the well, with the casing and tubing being positioned up to a depth of the subterranean zone so as to enable a conveyance of the effluents through the tubing to a surface installation;
   associating a seismic reception device comprising a plurality of seismic reception units to said butting at determined intervals, each of said seismic reception units including a sensing means, a support means and a deformation coupling means adapted to be pressed against an inner wall of the casing so as to substantially dampen vibrations from said tubing;
   lowering said tubing into the well so as to position the reception device at an optimum depth for conducting the surveying operations;
   coupling the respective reception units with the wall of the casing;
   achieving surveying cycles with said sensing means by triggering said source; and
   transmitting signals from said sensing means to a control and recording assembly while using the tubing to convey effluents out of the subterranean zone.

2. A method for conducting seismic or acoustic surveying operations of a subterranean zone producing effluents in a well drilled through geological formation to said subterranean zone, the method comprising the steps of:
   coupling a seismic or acoustic wave source with the geological formations;
   completion the well with a casing means and with a tubing means positioning the well up to said subterranean zone for conveying effluents to a surface installation, said tubing means being provided with a reception device comprising a plurality of acoustic or seismic reception units linked to the tubing means and each provided with a sensing means, a support means and a connecting means for displacing said sensing means from a first position nearer to the tubing means to a second position in contact with the casing means, the sensing means being mechanically uncoupled from said tubing means in said second position and transmission means for transmitting signals received by said sensing means to a control and recording assembly, said reception units being positioned at determined intervals therebetween and at an optimum depth for conducting said surveying operations; and
   achieving surveying cycles with said sensing means coupled to said raising means by triggering said source and transmitting signals received by said sensing means to the control and recording assembly, said surveying cycles being achieved while using said tubing means or conveying the effluents produced out of the subterranean zone.

* * * * *